(12) United States Patent
Taylor et al.

(10) Patent No.: US 7,815,714 B2
(45) Date of Patent: Oct. 19, 2010

(54) SYSTEMS AND METHODS FOR REMOVAL OF PARTICULATE MATTER IN A FILTRATION SYSTEM

(75) Inventors: Robert Taylor, Ponte Vedra Beach, FL (US); Charles Sedman, Hillsborough, NC (US)

(73) Assignee: General Electric Company, Schenectady, NY (US)

( * ) Notice: Subject to any disclaimer, the term of this patent is extended or adjusted under 35 U.S.C. 154(b) by 324 days.

(21) Appl. No.: 11/961,434

(22) Filed: Dec. 20, 2007

(65) Prior Publication Data

US 2009/0158926 A1    Jun. 25, 2009

(51) Int. Cl.
*B03C 3/014*    (2006.01)

(52) U.S. Cl. .................. 95/67; 55/DIG. 38; 95/73; 96/74

(58) Field of Classification Search .......... 95/60, 95/67, 73; 96/49, 74; 55/DIG. 38
See application file for complete search history.

(56) References Cited

U.S. PATENT DOCUMENTS

| | | | | |
|---|---|---|---|---|
| 2,825,102 A * | 3/1958 | Hicks et al. ............. | 422/4 |
| 3,807,137 A * | 4/1974 | Romell ................ | 95/72 |
| 3,899,308 A * | 8/1975 | Petersson ............ | 95/66 |
| 3,915,676 A * | 10/1975 | Reed et al. ............ | 96/32 |
| 3,945,813 A * | 3/1976 | Iinoya et al. .......... | 96/28 |
| 4,147,522 A * | 4/1979 | Gonas et al. ......... | 95/68 |
| 4,357,151 A * | 11/1982 | Helfritch et al. ...... | 95/68 |
| 4,670,026 A * | 6/1987 | Hoenig ................ | 95/73 |
| 4,888,158 A * | 12/1989 | Downs ............... | 423/243.04 |
| 5,158,580 A * | 10/1992 | Chang ................ | 95/70 |
| 5,217,511 A * | 6/1993 | Plaks et al. ......... | 96/55 |
| 5,746,792 A | 5/1998 | Clements et al. | |
| 6,203,591 B1 * | 3/2001 | Clements et al. ...... | 55/341.1 |
| 6,294,003 B1 * | 9/2001 | Ray .................. | 96/49 |
| 6,508,861 B1 * | 1/2003 | Ray .................. | 95/79 |
| 6,824,587 B2 * | 11/2004 | Mohamed ........... | 95/7 |
| 6,858,064 B2 * | 2/2005 | Bologa et al. ....... | 95/65 |
| 7,341,616 B2 * | 3/2008 | Taylor et al. ......... | 95/70 |
| 7,601,204 B2 * | 10/2009 | Woodruff et al. ..... | 96/30 |
| 2006/0174768 A1 * | 8/2006 | Taylor et al. ......... | 96/59 |
| 2007/0261556 A1 * | 11/2007 | Kasai et al. .......... | 96/74 |
| 2009/0158926 A1 * | 6/2009 | Taylor et al. ......... | 95/70 |

FOREIGN PATENT DOCUMENTS

GB      2048725 A   * 12/1980
JP      60-177614 A * 9/1985

* cited by examiner

*Primary Examiner*—Richard L Chiesa
(74) *Attorney, Agent, or Firm*—Mark E. Henderson; Ernest G. Cusick; Frank A. Landgraff

(57) ABSTRACT

A particulate filtration system for removing particulates suspended in a fluid that includes: 1) a filter element; 2) a pre-collector body component operably connected to the filter element and capable of receiving an electrical charge to attract and remove particles suspended in the fluid; and 3) means for cooling the pre-collector body component. The means for cooling the pre-collector body component may include a convective cooling channel through which a coolant flows. The system may further include a discharge electrode spaced apart from the pre-collector body component. The discharge electrode may be capable of receiving an electrical charge causing a difference in the electronic potential between the pre-collector body component and the discharge electrode.

20 Claims, 5 Drawing Sheets

SYSTEMS AND METHODS FOR REMOVAL OF PARTICULATE MATTER IN A FILTRATION SYSTEM

BACKGROUND OF THE INVENTION

The present invention relates generally to a filtration system and apparatus for removing particulate matter from a stream of gas or other fluid. More specifically, but not by way of limitation, the present invention encompasses a filtration system that includes a water-cooled electrostatic pre-collector apparatus and a fabric filter element for removing particulate matter from a stream of gas or other fluid.

Fabric filtration is a common technique for separating out particulate matter in a gas stream. In an industrial setting, fabric filtration is often accomplished in a device known as a baghouse. Generally, a baghouse includes a housing that has an inlet for receiving dirty, particulate-laden gas and an outlet through which clean gas leaves the baghouse. The interior of the housing is divided by a tube sheet into a dirty gas or upstream plenum and a clean gas or downstream plenum, with the dirty gas plenum in fluid communication with the inlet and the clean gas plenum in fluid communication with the outlet. The tube sheet typically includes a number of apertures and supports a number of filter elements with each filter element covering one of the apertures.

Generally, a filter element includes a support structure and a fabric filter media. The support structure, which is also called a core, typically has a cylindrical shape and is hollow. The walls of the support structure may be similar to a screen or a cage, or may simply include a number of perforations, so that a fluid may pass through the support structure. The support structure will have at least one end that is open and that is capable of being coupled to the tube sheet at an aperture. Customarily, the structure will extend from the tube sheet into the dirty gas plenum. There are several types of fabric filter media. A "bag" filter media is flexible and/or pliable and is shaped like a bag. A cartridge filter media is typically relatively rigid and pleated. Filter media are ordinarily mounted around the exterior or outer portion of the support structure.

In operation, particulate laden or dirty gas is conducted into the baghouse, and more specifically into the dirty gas plenum, through the inlet. The gas then flows through the fabric filter media to the interior space within the filter cores. As the gas flows through the filter media, the particulate matter carried by the gas engages the exterior of the filter media and either accumulates on the filters or falls to the lower portion of the dirty gas plenum. Thereafter, the cleaned gas flows through the apertures in the tube sheet and into the clean gas plenum. The clean gas then flows out of the baghouse through the outlet.

As particulate matter accumulates or cakes on the filters, the flow rate of the gas is reduced and the pressure drop across the filters increases. To restore the desired flow rate, a reverse pressure pulse may be applied to the filters. The reverse pressure pulse expands the filter media and separates the particulate matter, which falls to the lower portion of the dirty gas plenum. While filter material technology has advanced sufficiently to allow a given filter element to be cleaned in this manner tens of thousands of times before replacement is needed, further extension of a filter's useful life is economically desirable. Extended filter life not only saves the cost of filters, it also saves the cost of filter replacement, which is often difficult, costly and requires the baghouse to be taken out of service for a period of time.

Another common technique for separating particulate matter from a gas stream is to use an electrostatic device, such as an electrostatic precipitator. In this device, particulate matter is electronically charged and then collected through the action of an electric field. A typical electrostatic device provides a discharge electrode that is maintained at a high voltage and a non-discharge electrode that is maintained at a relatively lower voltage or at ground. As the particulate-laden gas stream flows past the electrodes, the electric field present between the electrodes operates to charge a percentage of the passing particulate matter and causes them to collect on the non-discharge electrode. However, as the particulate matter coats the non-discharge electrode, an electrical resistivity increases, causing further collection of charged particulate matter more and more difficult. It has been discovered that the electrical resistivity of the particulate matter coat on the electrode is a function of temperature. More specifically, as the temperature of the particulate matter coat decreases, the electrical resistivity of the particulate matter coat decreases also, which may allow further collection of particulate matter on the non-discharge electrode.

An electrostatic precipitator may be used to pre-collect particulate matter in filtering environment. However, the usefulness of an electrostatic precipitator may be minimized in an environment where the non-discharge electrode becomes quickly coated with particulate matter, such as, for example, a baghouse filter chamber of a coal-fired power plant. This may be reversed by cooling the particulate matter coating such that the resistivity remains low. Thus, there is a need for systems for cooling the non-discharge electrode to improve the pre-collection of particulate matter by the electrostatic device.

BRIEF DESCRIPTION OF THE INVENTION

The present application thus describes a particulate filtration system for removing particulates suspended in a fluid that includes: 1) a filter element; 2) a pre-collector body component operably connected to the filter element and capable of receiving an electrical charge to attract and remove particles suspended in the fluid; and 3) means for cooling the pre-collector body component. In some embodiments, the means for cooling the pre-collector body component may include a convective cooling channel through which a coolant flows. The coolant may be water.

In some embodiments, the convective cooling channel may be a serpentine path adjacent to the pre-collector body component. The convective cooling channel may be adjacent to an interior surface of the pre-collector body component. The convective cooling channel may be part of a cooling circuit that includes a coolant pump for circulating the coolant through the circuit and a heat exchanger for dissipating the heat absorbed by the coolant in the convective cooling channel.

The system may further include a discharge electrode spaced apart from the pre-collector body component. The discharge electrode may be capable of receiving an electrical charge causing a difference in the electronic potential between the pre-collector body component and the discharge electrode. The difference in the electric potential between the pre-collector body component and the discharge electrode may be at least 20,000 volts. The pre-collector body component may include a cylindrical tube having a substantially continuous sidewall surface, an open first end, and a closed second end. The cylindrical tube includes a number of apertures extending through the sidewall surface of the tube.

The present application further describes a filter assembly for use in a particulate filtration system that includes a housing divided into a first plenum and a second plenum by a tube sheet with the first plenum in fluid communication with an inlet and the second plenum in fluid communication with an outlet, the tube sheet defining an aperture extending between the first plenum and the second plenum, the system further including a discharge electrode coupled to a first electric potential. The filter assembly may include a support frame having a first end that is adapted to couple to the tube sheet at an aperture and a second end; a filter media positioned around the periphery of the support frame; a pre-collector body component coupled to the second end of the support frame, the pre-collector body component being electrically coupled to a second electric potential; and means for cooling the pre-collector body component. The difference in the first electric potential and the second electric potential is operable to cause at least a portion of the particulates in the first plenum to collect on the pre-collector body component.

In some embodiments, the means for cooling the pre-collector body component may include a convective cooling channel through which a coolant flows. The convective cooling channel may include a serpentine path adjacent to the pre-collector body component. The pre-collector body component may be made substantially of metal. The pre-collector body component may include a cylindrical tube having a substantially continuous sidewall surface, an open first end, and a closed second end. The cylindrical tube may include a number of apertures extending through the sidewall surface of the cylindrical tube. The pre-collector body component may be positioned upstream of the filter element.

The present application further describes a method for removing particulates suspended in a fluid flowing through a housing, the housing divided into a first plenum and a second plenum by a tube sheet, the first plenum in fluid communication with an inlet, the second plenum in fluid communication with an outlet, the tube sheet defining an aperture extending between the first plenum and the second plenum, the method including: 1) providing a filter element having a first end sealingly coupled to the tube sheet and adjacent the aperture, the filter element extending from the tube sheet into the first plenum; 2) providing a pre-collector body component located upstream of the filter element; 3) cooling the pre-collector body component; 4) providing a discharge electrode; and 5) coupling the pre-collector body component to a first electric potential and the discharge electrode to a second electric potential wherein the first electric potential and the second electric potential are different so that at least a portion of the particles suspended in the fluid moving between the pre-collector body component and discharge electrode are attracted to one of the pre-collector body component or discharge electrode and any remaining particles are removed from the fluid as the fluid passes through the filter element. In some embodiments, the first electric potential is ground and the second electronic potential may be between negative 20,000 volts and negative 50,000 volts DC. The step of cooling the pre-collector body component includes providing a convective cooling channel that is adjacent to the pre-collector body component.

These and other features of the present application will become apparent upon review of the following detailed description of the preferred embodiments when taken in conjunction with the drawings and the appended claims.

DETAILED DESCRIPTION OF THE INVENTION

Figure 1:
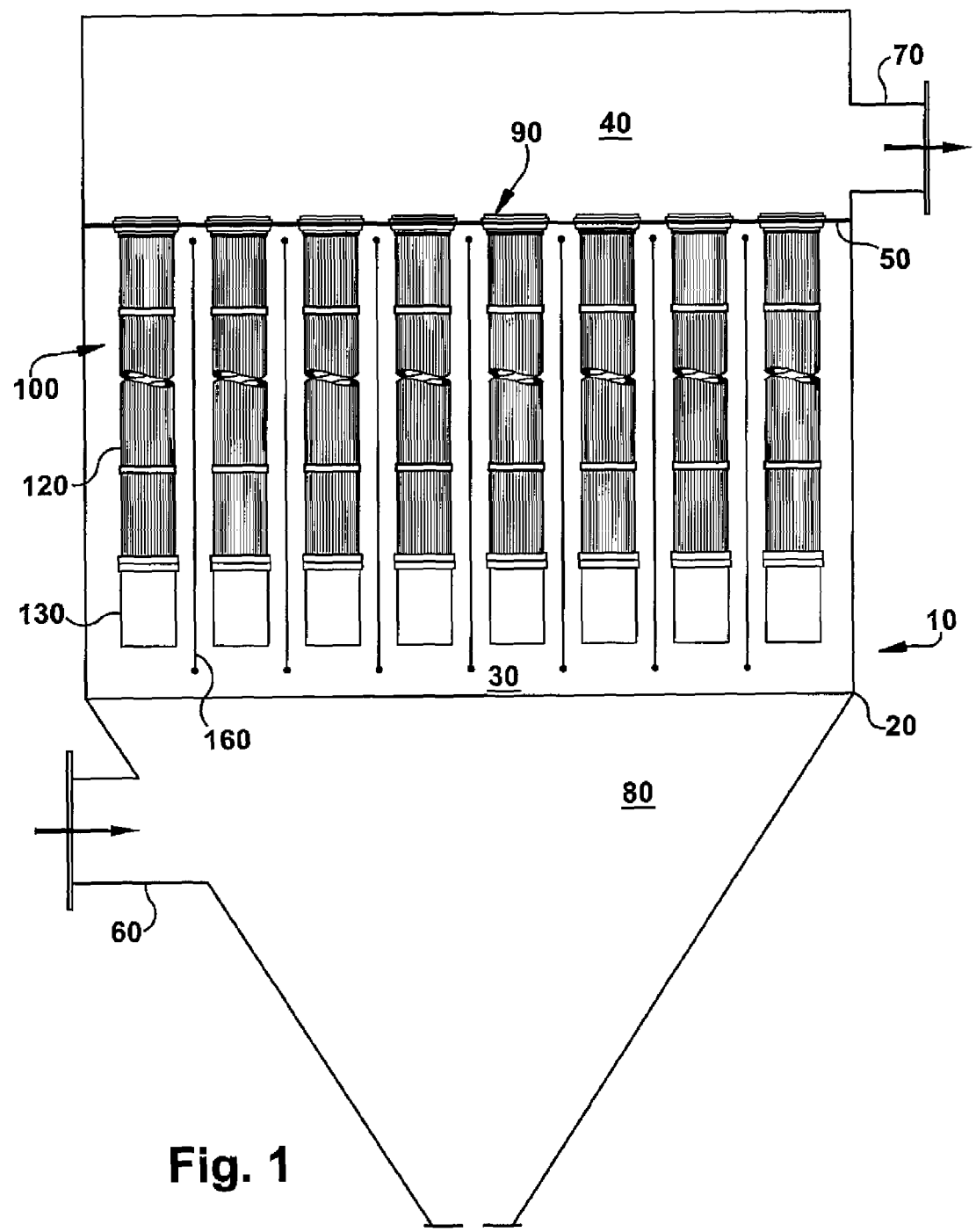
FIG. 1 is a schematic view, partly in section, of a filtration system in which exemplary embodiments of the present invention may operate.

Referring now to the figures, where the various numbers represent like parts throughout the several views, FIG. 1 demonstrates a filtration system 10 according to one embodiment of the present invention. The filtration system 10 generally may include an enclosed housing 20 and a plurality of filter assemblies 100. Each filter assembly 100 may include a filter element 120 and a pre-collector body component 130 extending below and attached to the filter element 120. The system 10 also may include a pre-collector discharge electrode 160. Dirty gas may enter the housing 20 and clean gas may leave. More specifically, the dirty gas may pass adjacent to the pre-collector body components 130 and discharge electrodes 160, which may operate to remove at least a portion of the particulate matter in the dirty gas. Thereafter, the gas may pass through the filter elements 120 where additional particulate matter may be removed. Because of the operation of the pre-collector body components 130 and discharge electrodes 160, however, the filter elements 120 may have less particulate matter to remove and, therefore, the filter material of the filter elements will require fewer cleaning cycles for a longer useful service life.

The housing 20 may be divided into a first plenum 30 and a second plenum 40 by a tube sheet 50. A suitable material for both the housing 20 and the tube sheet 50 may be a metal plate. The housing 20 also may include an inlet 60 that is in fluid communication with the first plenum 30 and an outlet 70 that is in fluid communication with the second plenum 40. An accumulation chamber 80 may be located at the lower end of the first plenum 30 and may be defined by irregularly shaped and sloped walls. For example, the accumulation chamber 80 may have a V-shaped cross-section, as illustrated in FIG. 1.

At least a portion of the tube sheet 50 may be substantially planar. The tube sheet 50 may include a plurality of apertures, such as aperture 90, that extend through the planar portion of the sheet 50. FIG. 1 shows a number of filter assemblies 100 hanging from the tube sheet 50 and extending through the apertures 90 in the sheet 50. Each filter assembly 100 may be supported at its upper end by the tube sheet 50 and may hang downwardly in a substantially vertical direction. It should be understood that in operation, there may be a filter assembly 100 associated with each aperture 90 in the sheet 50. Also, the filter assemblies 100, as illustrated, do not extend into the accumulation chamber 80, but it should be apparent that filter assemblies could be made with a length that allowed them to extend into the accumulation chamber 80.

Each filter assembly 100 may include a filter element 120 and a pre-collector body component 130. The pre-collector body component 130 may be coupled to and supported by the lower end of the filter element 120. A pre-collector discharge electrode 160 may hang vertically between the filter assemblies 100.

It should be understood that the filter assemblies 100 may be arrayed in a vertically extending matrix in a typical housing 20 as is known in the baghouse industry. The discharge electrodes 160 may be positioned in a number of different locations within the typical baghouse. For example, as indicated in FIG. 1, the discharge electrodes 160 may be positioned in their own rows and columns between and aligned with the filter assemblies 100. Alternatively, the discharge electrodes 160 may be offset from those devices so that in effect, the discharge electrodes are positioned at the center of each square of four filter assemblies 100. It is also within the scope of this invention for the discharge electrodes 160 to be positioned between every other or every third filter assembly 100 or square of four filter assemblies 100. Of course, additional locations for the discharge electrodes 160 also are within the scope of this invention.

Figure 2:
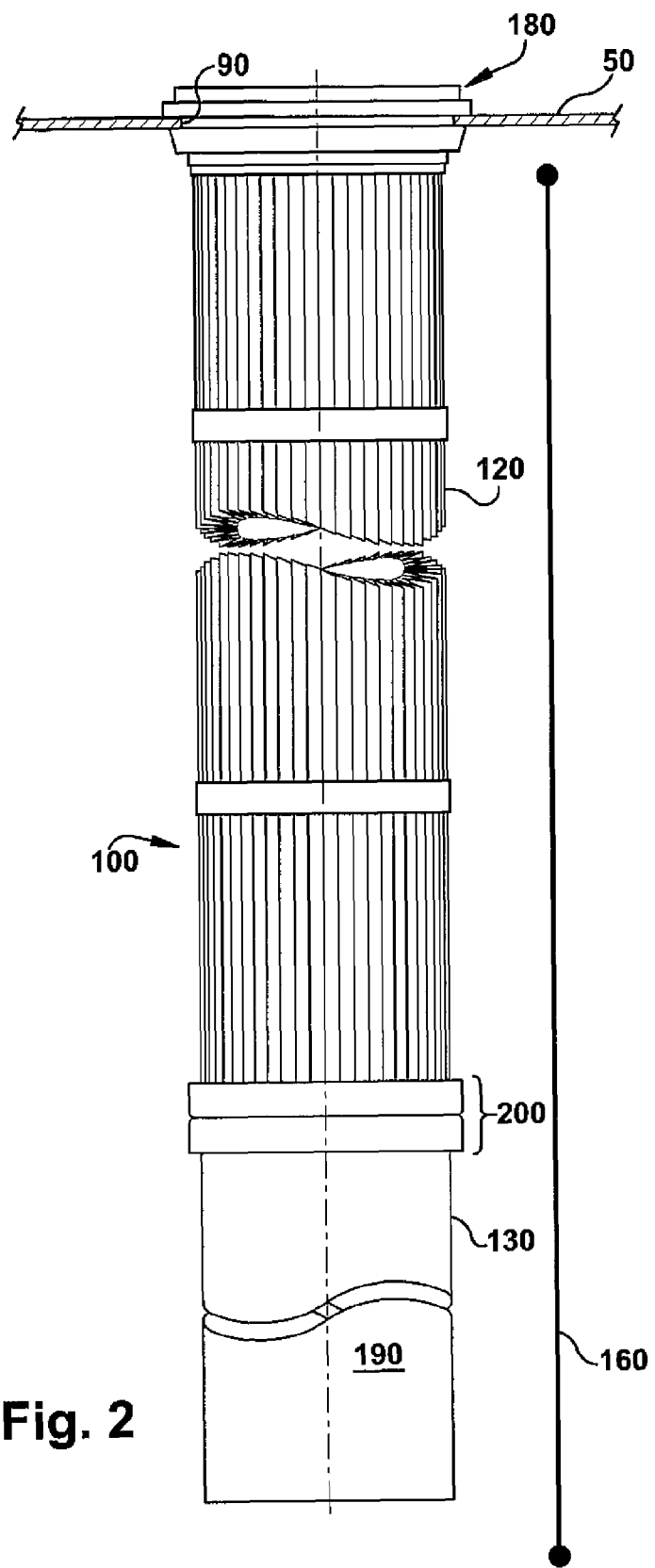
FIG. 2 is an elevational view of one embodiment of a filter assembly and pre-collector apparatus in which exemplary embodiments of the present invention may operate.

In one embodiment, the filter assembly 100 (FIG. 2) may be coupled to the tube sheet 50 at an aperture 90 by a collar 180. Although the filter assembly 100 is shown having a circular cross section, it will be apparent that any suitable configuration cross section could be used, such as, but not limited to, an oval or a rectangle. The pre-collector body component 130 may be coupled to the filter element 120 at a connection 200, so that the pre-collector body component 130 extends co-axially with the filter element 120 upstream from the filter element 120. The collar 180 and the connection 200 will be described below.

The filter element 120 preferably may include a pleated filter media. The pleated filter media may be formed in a substantially tubular shape with accordion folds at its inner and outer peripheries. The pleated filter media may be constructed of any suitable material for a desired filtering requirement.

The pre-collector body component 130 preferably may have a tubular shape. It should be understood that the pre-collector body component 130 is not limited to this shape and that other shapes are included within the scope of this invention, such as a rectangular or oval shape. The pre-collector body component 130 is made of any suitable electrically conductive material or, alternatively, may be coated by any suitable electrically conductive material. Preferably, the pre-collector body component 130 may be made substantially of metal such as conductive carbon steel. In this embodiment, the outer surface or sidewall 190 of the pre-collector body component 130 may be substantially continuous, that is, it has no holes or perforations. As discussed in more detail below, the pre-collector body component 130 may have a convective cooling channel (not shown in FIG. 2) that runs along its interior surfaces. The convective cooling channel may include a conventional loop cooling circuit that loops down from the collar 180, through the filter assembly 100, through the connection 200, circulates through the pre-collector body component 130, and then returns to the collar 180. Coolant, such as air, water, or other coolant, may be circulated through the convective cooling channel to cool the surface of the pre-collector body component 130.

The discharge electrode 160 may extend vertically and may be spaced a short distance horizontally from the pre-collector body component 130. The discharge electrode 160 may be made from an electrically conductive material such as a thin wire of stainless steel. In operation, as will be discussed later, the discharge electrode 160 may be electrically coupled to a voltage source, so that it obtains and maintains an electric potential or charge relative to the pre-collector body component 130. In one embodiment, the discharge electrode 160 is coupled to line voltage through a transformer and rectifier (not shown) so that the discharge electrode is maintained at a voltage potential between negative 20,000 and negative 50,000 volts DC. The discharge electrode 160 may be entirely or partially shielded (i.e. only that length that corresponds to the length of the pre-collector body component 130) to lessen the likelihood that electrical current will arc between the pre-collector body component 130 and the discharge electrode 160. Shielding is suggested if the discharge electrode 160 is to be placed in close physical proximity to the pre-collector body component 130 or if the electric potential or charge provided to the discharge electrode 160 and/or the pre-collector body component 130 is notably large relative to the distance between the pre-collector body component 130 and the discharge electrode 160.

Figure 3:
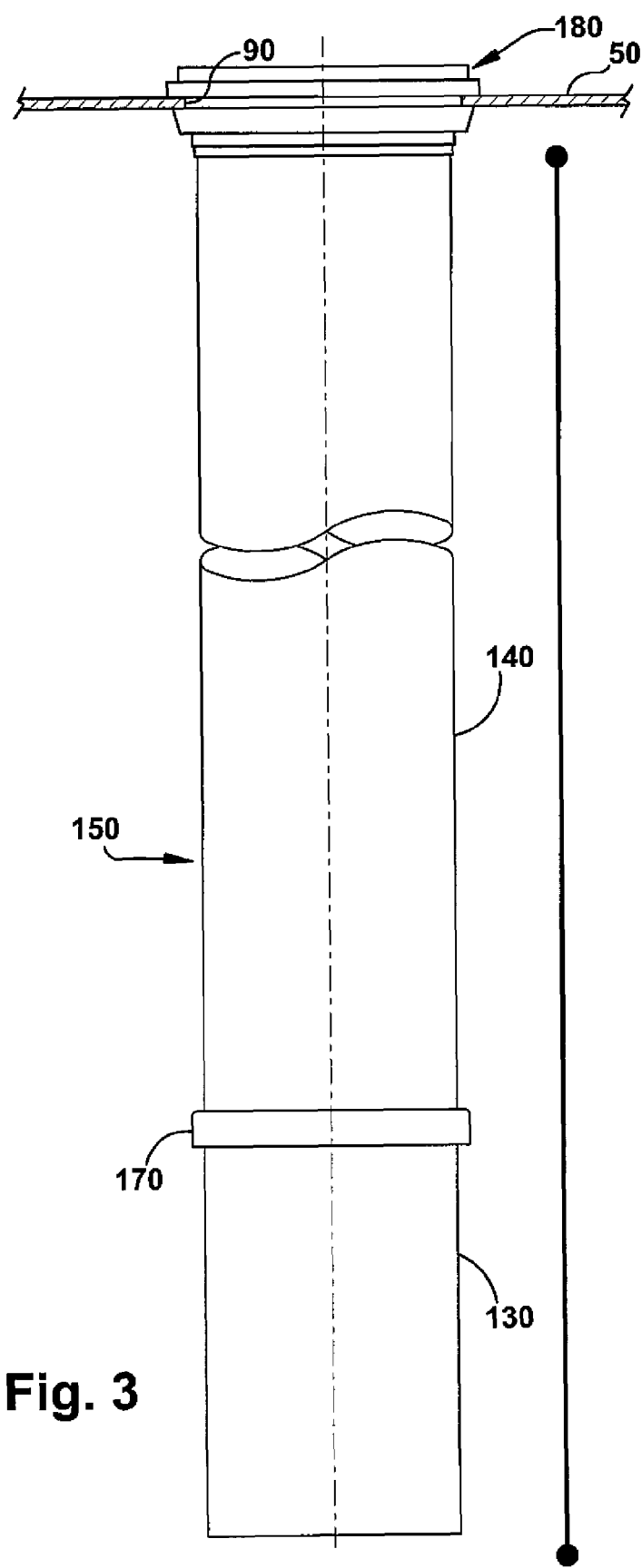
FIG. 3 is an elevational view of a second embodiment of a filter assembly and pre-collector apparatus in which exemplary embodiments of the present invention may operate.

Another embodiment of a filter assembly 150 coupled to the tube sheet 50 at an aperture 90 by a collar 180 is illustrated in FIG. 3. In this embodiment, the filter assembly 150 may include a bag filter element 140 instead of a pleated filter element 120. The bag filter element 140 may be made from a flexible, pliable fabric. The fabric may be any suitable material for the desired filtering requirement. The pre-collector body component 130 may be coupled to the filter bag element 140 at a connection 170, so that the pre-collector body component 130 may extend co-axially with the filter bag element 140 upstream from the bag filter element. A convective cooling channel (not shown) may be provided as discussed above in relation to the embodiment of FIG. 2.

Figure 4:
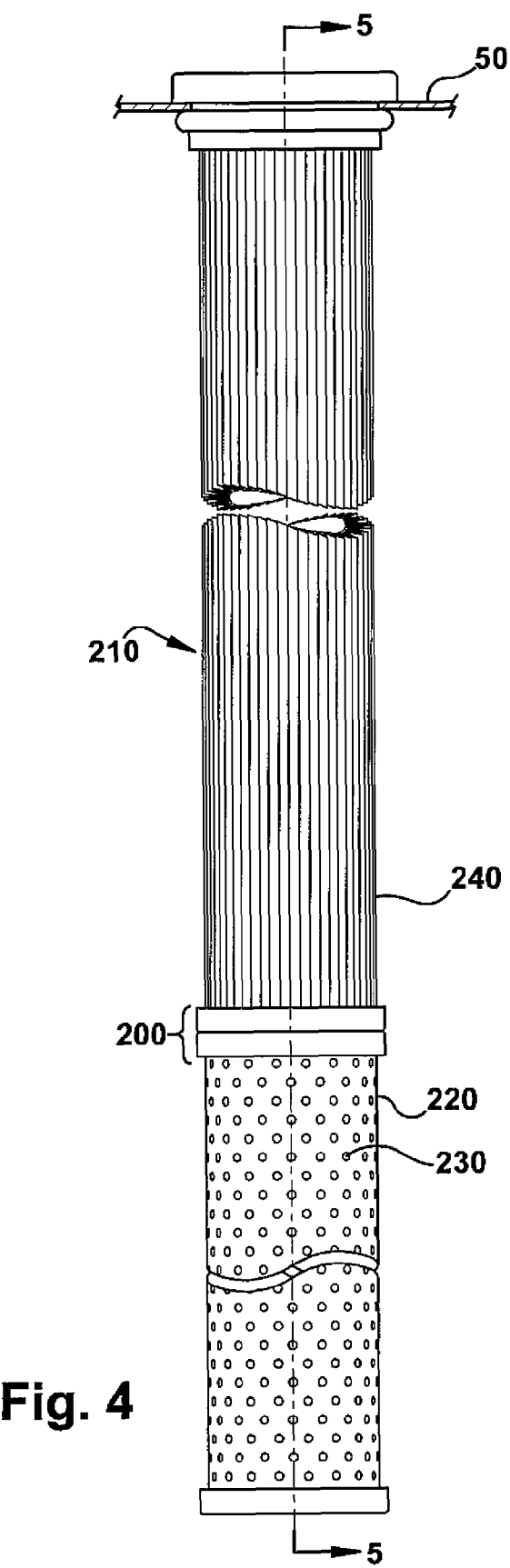
FIG. 4 is an elevational view of another embodiment of a filter assembly and pre-collection apparatus according to an exemplary embodiment of the present invention.

A filter assembly 210 according to another embodiment that includes a pre-collector body component 220 is illustrated in FIG. 4. In this embodiment, filter assembly 210 also includes a pleated filter element 240. Also in this embodiment, the pre-collector body component 220 is a hollow tube that has a plurality of apertures or perforations 230 extending therethrough. Preferably, the pre-collector body component 220 has approximately 30% to 60% of its surface area occupied by the apertures 230. The primary function of the apertures 230 is to reduce the weight of the pre-collector body component 220. As with the previous embodiment, the pre-collector body component 220 may be made from or coated by any suitable electrically conductive material. One such suitable material that the pre-collector body component 220 could be made from is carbon steel. A convective cooling channel (not shown) may be provided as discussed above in relation to the embodiment of FIG. 2.

Figure 5:
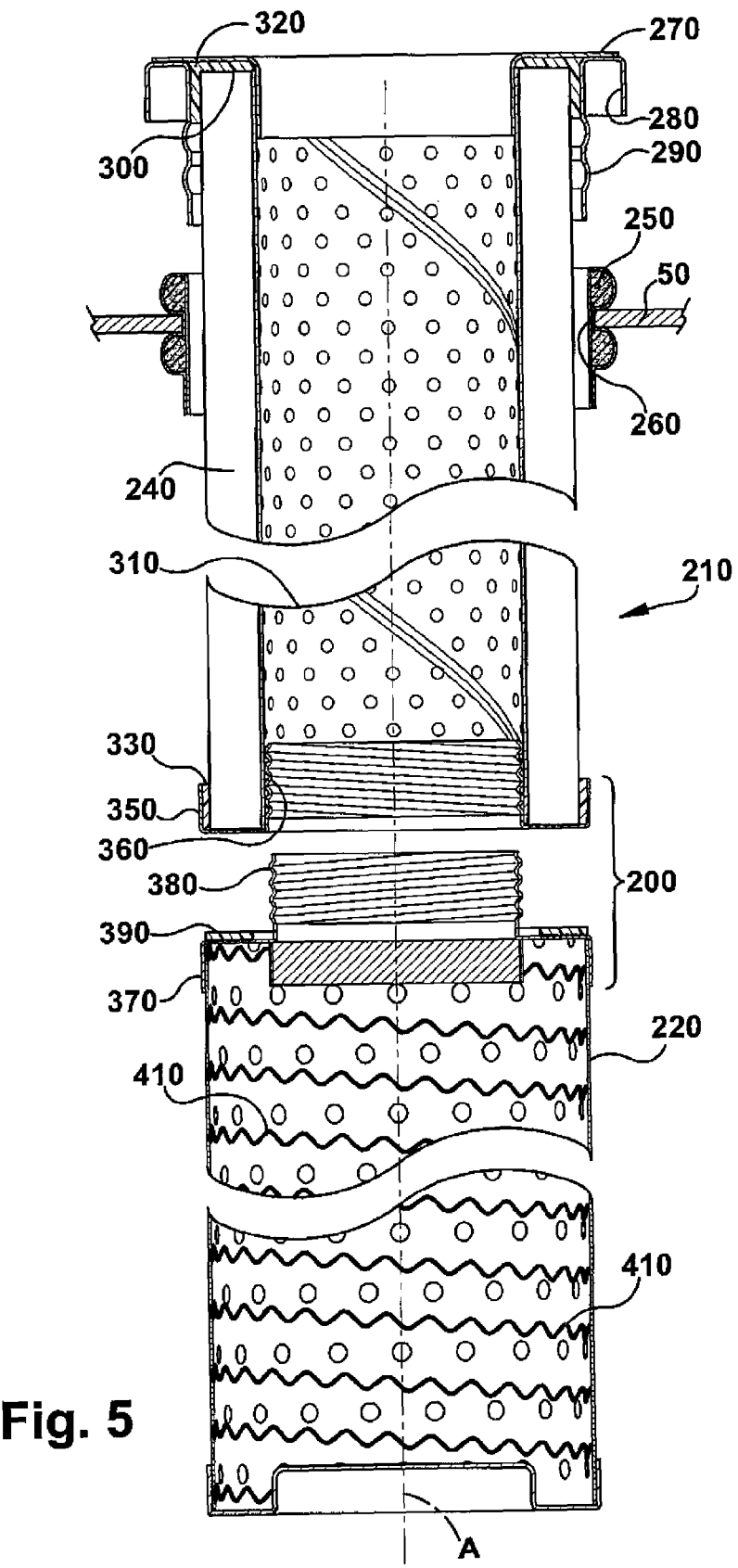
FIG. 5 is an exploded sectional view of the filter assembly and pre-collection apparatus illustrated in FIG. 4, taken approximately along the line 55 in FIG. 4.

The filter assembly 210 is illustrated in FIG. 5 as partially installed. The filter assembly 210 may extend through an aperture 260 in the tube sheet 50 and through a resilient mounting band 250. The band 250 may ensure that the filter assembly 210 may be used with apertures that have not been precisely cut. The band 250 may include resilient metal, such as a stainless steel, and may be covered with fabric. The band 250 may be constructed with an outer diameter substantially equal to the inner diameter of the aperture 260 and may be easily deformed and inserted into the aperture 260 so that the exterior surface of the band 250 will snugly engage the surface defining the aperture 260. The band 250 may provide a seal between the filter assembly 210 and the aperture 260 in the tube sheet 50.

Filter assembly 210 also may include a mounting sleeve 270 located at its upper end to attach the filter assembly 210 to the tube sheet 50. The mounting sleeve 270 may be made from a suitable material, such as stamped, drawn or otherwise formed metal. The mounting sleeve 270 may define an open end of the filter assembly 210 for fluid communication with the clean gas plenum 40. The mounting sleeve 270 may be shaped so as to include a channel 280 for receiving a part of the band 250 when the filter is moved into an operational position. The mounting sleeve 270 further may include a tubular portion 290 that is adapted to be located within and extend through the aperture 260 in the tube sheet 50 and through the band 250.

A core 310 may be fixed to and extends from the mounting sleeve 270. The core 310 may be made from a suitable material, such as perforated sheet metal, expanded metal, or mesh screen. A radially inner channel 300 in the mounting sleeve 270 may receive an upper end of the core 310. The upper end of the core 310 and the mounting sleeve 270 sleeve may be connected together in a suitable manner, such as by welds, rivets, fasteners, or metal deformation. Thus, a relatively strong connection and structure may exist that is capable of supporting the weight of the filter assembly 210 as it hangs from the tube sheet 50 even when the filter assembly has a relatively heavy accumulation of particles and the convective cooling channels are filled with liquid coolant. Additionally, the connection may establish electrical communication between the mounting sleeve 270 and the core 310 so that these structures will have the same electrical potential.

A pleated filter element 240 may be located concentrically around the core 310. The pleated filter element 240 may be formed in a substantially tubular shape about the perimeter of the core 310 with accordion folds at its inner and outer peripheries. The pleated element 240 may be constructed of any suitable material for a desired filtering requirement. The upper end of the pleated element 240 also may be located in the channel 300 of the mounting sleeve 270 and placed in a potting material 320, which may act to seal the pleated element and the mounting sleeve. The pleated element 240 may be located radially inward of the core 310.

The filter element 240 and the pre-collector body component 220 may be connected by a threaded connection 200. The threaded connection 200 may include a collar 350 located at the lower end (as viewed in FIG. 4) of the filter assembly 210. The collar 350 may have a receiving internally threaded portion 360. The collar 350 may be fixed to the core 310 and/or filter element 240 in a suitable manner such as by welds, rivets, fasteners or metal deformation and, as in this embodiment, it may also be sealed to pleated filter element 240 by an potting material 330. The connection between the collar 350 and the core 310 may establish electrical communication between these two structures so that they have the same electrical potential.

The threaded connection 200 also may include a collar 370 located at the upper end of the pre-collector body component 220. The collar 370 may have an externally threaded tubular portion 380 for threaded engagement with the receiving portion 360. The collar 370 may be fixed to the pre-collector body component 220 in a suitable manner such as by welds, rivets, fasteners or metal deformation. Thus, electrical communication may be established between the collar 350, the collar 370 and the pre-collector body component 220 so that these structures have the same electronic potential.

A compressible gasket 390 may be located between a lower end surface of the collar 350 of the filter assembly 210 and an upper end surface of the collar 370 of the pre-collector body component 220. The gasket 390 may compress as the filter element 240 and the pre-collector body component 220 may be connected together when filter element 240 and the pre-collector body component 220 may be relatively rotated about a longitudinal central axis A to engage the threaded portions 360, 380 and thread the collar 370 into the collar 350. The connection device 200 may have a size capable of fitting through the effective size of the apertures 90 or 260 in the tube sheet 50 and a strength sufficient to support the operational weight of the pre-collector body component 220. Of course, it should be understood that other connection devices, such as a clamp or the like, may be employed in alternate embodiments to connect the filter assembly and pre-collector apparatus body component.

It should be understood that the sidewall of pre-collector body component 220 is electrically coupled to the tube sheet 50. This electrical connection is accomplished through a series of physical connections. First, the sidewall of body component 220 is in contact with the collar 370, which, in turn, is in contact with the collar 350 when the pre-collector body component 220 is installed on the filter assembly 210. The collar 350 is in physical contact with the core 310, and the core 310 is in physical contact with the mounting sleeve 270. Mounting sleeve 270, in turn, is in contact with the mounting band 250, which is in contact with the tube sheet 50. Finally, the tube sheet 50 is in contact with the housing 20. Thus, the pre-collector body component 220 will have the same electric potential as the housing 20. As stated earlier, preferably, the pre-collector body component 220 is also grounded since the housing 20 is grounded.

The pre-collector body component 220 further may have one for more convective cooling channels 410. In some embodiments, the convective cooling channel 410 may run circumferentially around the interior surface of the pre-collector body component 220. In some embodiments, as demonstrated in FIG. 5, the convective cooling channel 410 may wind in a serpentine fashion such that convective exchange between the convective cooling channels and the pre-collector body component 220 is maximized. The convective cooling channel 410 may weave through the plurality of perforations 230. The convective cooling channel 410 thusly may spiral down the pre-collector body component 220 and then return via a vertical track (not shown) along the interior surface of the pre-collector body component 220 to the top of the pre-collector body component 220 to complete the circuit.

Pursuant to conventional methods, the convective cooling channel may be supplied and drained by a supply channel (not shown) and a drain channel (not shown), which form the remainder of the cooling circuit. A first end of the convective cooling channel may connect to the supply channel. Pursuant to methods and systems known in the art, the supply channel may originate at a conventional coolant pump (not shown), travel into the second plenum 40, along the tube sheet 50, through the aperture 90, downward through the interior of the filter assembly 100, to the top of the pre-collector body component 220, where it may connect with the convective cooling channel 410 per conventional methods.

The drain channel (not shown) may connect to the second end of the convective cooling channel. Pursuant to conventional methods and systems known in the art, from this connection, the drain channel may travel upward through the interior of the filter assembly, through the aperture 90, along the tube sheet 50, out of the second plenum 40, to a heat exchanger (not shown). The heat exchange may be any known heat exchanger for use with whatever particular coolant is being used in the coolant circuit. For example, a conventional cross-flow convective heat exchange may be used. From the heat exchanger, the drain channel may connect to the coolant pump to complete the cooling circuit.

In operation, the discharge electrode 160 and pre-collector body component 220 (FIG. 3 or 4), 130 (FIG. 2) may have a difference in voltage potential. As stated earlier, in one embodiment the discharge electrode 160 may be coupled to line voltage through a transformer and rectifier (not shown) so that the discharge electrode 160 is maintained at a voltage potential between negative 20,000 and negative 50,000 volts DC and the body component 220 (FIG. 3 or 4), 130 (FIG. 2) is grounded. It should be understood that the discharge electrode 160 could be provided with a positive electrical potential or that the voltages may be reversed. Of course, precautions such as insulation and shielding prevent electrical contact between the discharge electrodes 160 and the pre-collector body component 220 (FIG. 3 or 4), 130 (FIG. 2), the tube sheet 50, and/or the housing 20 may be used.

Particulate-laden gas may enter the first plenum 30 (FIG. 1) through the inlet 60. A fan (not shown) may be utilized to cause the gas to move through system 10. Once in the first plenum 30, the gas may pass adjacent to the pre-collector body components 130 and the discharge electrodes 160. As described, the pre-collector body components 130 and discharge electrodes 160 may be separately coupled to a power source or to ground so that an electrical potential difference exists between these components. This electrical potential difference may cause at least a portion of the particulate matter in the gas to collect on the pre-collector body components 130. More specifically, the discharge electrode 160 may emit negative ions such that airborne particles that come in proximity therewith become charged. The negatively charged particles then may be electrostaticly attracted to the grounded pre-collector body component 130 and collect thereon, giving away their charge to ground. No electrical field or potential is intentionally created across the filter element 120 of the filter assembly 100.

Thereafter, the gas may pass through the filter elements 120 (FIG. 2) and into the interior of the filter assemblies 100, which will cause the particulate matter carried by the gas (which will be less because of the pre-collection of particles by the pre-collector body component 130) to separate by the filter elements and either accumulate on or in the filter elements or separate from the gas and fall to the lower portion 80 of the first plenum 30. Next, the cleaned gas passes from the interior of the filter assemblies 100 through an aperture 90 in the tube sheet 50 and into the second plenum 40. Ultimately, the cleaned gas will exit the system 10 through the outlet 70.

As stated, the pre-collector body component 130 and discharge electrodes 160 may be separately coupled to a power source or to ground so that an electrical potential difference exists between these elements. In addition, incoming particles generally have a negative charge. Such particles will be repelled by the negatively charged discharge electrodes 160 and electrostaticly attracted to the ground charge of the pre-collector body components 130. Thus, preferably, the pre-collector discharge electrodes 160 may be electrically coupled to a large negative voltage and the pre-collector body component 130 may be electrically coupled to ground, which should tend to cause particles to collect on the pre-collector body components.

The pre-collector body component 130, after sufficient use, will become coated with particulate matter. This coating of particulate matter may make it difficult for the pre-collector body 130 to collect further airborne particulate matter. More specifically, the electrical resistivity of the particulate matter coat may act to effectively insulate the pre-collector body 130. Because of this, airborne particles will either fail to be attracted to the pre-collector body 130 or have to be charge to a preemptively high negative charge to overcome the voltage drop associated with the electrical resistivity of the particulate matter coat. Either result is undesirable. As one of ordinary skill in the art will appreciate, the electrical resistivity of the coating of particulate matter varies directly with temperature. That is, as the temperature of the coating of particulate matter increase, so does its electrical resistivity. Accordingly, if the coating of particulate matter is kept at a cooler temperature, additional negatively charged airborne particles may continue to be attracted to and attach themselves to the pre-collector body.

The cooling circuit (with the convective cooling channels 410) described above may be used to cool the pre-collector body 130, which in turn may cool the particulate matter collected thereon, thereby lowing it electrical resistivity and allowing the pre-collector body 130 to attract additional negatively charged airborne particles. The coolant pump (not shown) may circulate the coolant through the supply channel (not shown) to the convective coolant channel 410 within the pre-collector body 130. The interface between the convective coolant channel 410 and the pre-collector body 130 may be of a material, such as metal, that promotes heat exchange. The coolant then may circulate through the convective cooling channel 410 and cool the pre-collector body 130 by absorbing heat. Once through the convective cooling channel 410, the coolant may flow through the drain channel (not shown) to the heat exchanger (not shown). Note that in some embodiments, the coolant may not be recirculated. At the heat exchanger, the coolant may be cooled such that the heat absorbed in the convective cooling channel 410 is dissipated. The coolant then may flow to the coolant pump where the circuit begins anew.

In addition, conventional baghouse filtration systems require a diverse mix of particles sizes to exhibit acceptable pressure drop values across the filter elements. As the size distribution of incoming particles decreases in a conventional fabric filter, the system pressure drop will increase and pulse cleaning intervals will decrease. In other words, as the particle size becomes more uniform, the system pressure drop increases requiring more frequent cleaning. Fine dust tends to create a very compact dust layer on the surface of the filter elements, which drives up system pressure drop.

The electrically stimulated fabric filtration system of the present application overcomes this problem with the charging the incoming particles. The relatively larger particles are more readily charged than the relatively smaller particles, and, therefore, these larger particles are more likely to attach to the pre-collector bodies 130, leaving smaller "like" charged particles to gather on the surface of the filter element. These "like" charged smaller particles tend to repel one another on the surface of the filter element, which creates a more porous dust layer. As a result, combining pre-cleaning of the particle burden with an electrically stimulated fabric filter of the present application reduces or eliminates much of the pressure drop problem experience by conventional pulse jet filter systems, and thereby increases the useful life to the filter elements.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A particulate filtration system for removing particulates suspended in a fluid, the system comprising:
   a fabric filter element having a first end and a second end;
   a pre-collector body component operably connected to the filter element and capable of receiving an electrical charge to attract and remove particles suspended in the fluid, said pre-collector body component comprising a substantially continuous sidewall surface, an open first end, and a closed second end, said open first end of said pre-collector body component connected to said second end of said filter element; and means for cooling the pre-collector body component.

2. The system of claim 1, wherein the means for cooling the pre-collector body component comprises a convective cooling channel through which a coolant flows and the filter element comprises a fabric filter.

3. The system of claim 1, wherein the coolant comprises water.

4. The system of claim 1, wherein the convective cooling channel comprises a serpentine path adjacent to the pre-collector body component.

5. The system of claim 1, wherein the convective cooling channel is adjacent to an interior surface of the pre-collector body component.

6. The system of claim 1, wherein the convective cooling channel is part of a cooling circuit that includes a coolant pump for circulating the coolant through the circuit and a heat exchanger for dissipating the heat absorbed by the coolant in the convective cooling channel.

7. The system of claim 1, further including a discharge electrode spaced apart from the pre-collector body component, the discharge electrode capable of receiving an electrical charge causing a difference in the electronic potential between the pre-collector body component and the discharge electrode.

8. The system of claim 7, wherein the difference in the electric potential between the pre-collector body component and the discharge electrode is at least 20,000 volts.

9. The system of claim 1, wherein the pre-collector body component includes a cylindrical tube having a substantially continuous sidewall surface, an open first end, and a closed second end.

10. The system of claim 9, wherein the cylindrical tube includes a plurality of apertures extending through the sidewall surface of the cylindrical tube.

11. A filter assembly for use in a particulate filtration system, the system including a housing divided into a first plenum and a second plenum by a tube sheet with the first plenum in fluid communication with an inlet and the second plenum in fluid communication with an outlet, the tube sheet defining an aperture extending between the first plenum and the second plenum, the system further including a discharge electrode coupled to a first electric potential, the filter assembly comprising:

a support frame having a first end that is adapted to couple to the tube sheet at an aperture and a second end;

a fabric filter media positioned around the periphery of the support frame;

a pre-collector body component comprising a substantially continuous sidewall surface, an open first end, and a closed second end, said open first end coupled to the second end of the support frame, the pre-collector body component being electrically coupled to a second electric potential; and means for cooling the pre-collector body component;

wherein the difference in the first electric potential and the second electric potential is operable to cause at least a portion of the particulates in the first plenum to collect on the pre-collector body component.

12. The filter assembly of claim 11, wherein the means for cooling the pre-collector body component comprises a convective cooling channel through which a coolant flows.

13. The filter assembly of claim 11, wherein the convective cooling channel comprises a serpentine path adjacent to the pre-collector body component.

14. The filter assembly of claim 11, wherein the pre-collector body component is made substantially of metal.

15. The filter assembly of claim 11, wherein the pre-collector body component includes a cylindrical tube having a substantially continuous sidewall surface, an open first end, and a closed second end.

16. The filter assembly of claim 15, wherein the cylindrical tube includes a number of apertures extending through the sidewall surface of the cylindrical tube.

17. The filter assembly of claim 11, wherein the pre-collector body component is positioned upstream of the fabric filter media.

18. A method for removing particulates suspended in a fluid flowing through a housing, the housing divided into a first plenum and a second plenum by a tube sheet, the first plenum in fluid communication with an inlet, the second plenum in fluid communication with an outlet, the tube sheet defining an aperture extending between the first plenum and the second plenum, the method comprising:

providing a fabric filter element having a first end sealingly coupled to the tube sheet and adjacent the aperture, the fabric filter element extending from the tube sheet into the first plenum;

providing a pre-collector body component located upstream of the fabric filter element, said pre-collector body component comprising a substantially continuous sidewall surface, an open first end, and a closed second end, said open first end of said pre-collector body component connected to said second end of said filter element;

cooling the pre-collector body component;

providing a discharge electrode; and coupling the pre-collector body component to a first electric potential and the discharge electrode to a second electric potential wherein the first electric potential and the second electric potential are different so that at least a portion of the particles suspended in the fluid moving between the pre-collector body component and discharge electrode are attracted to one of the pre-collector body component or discharge electrode and any remaining particles are removed from the fluid as the fluid passes through the fabric filter element.

19. The method of claim 18, wherein the first electric potential is ground and the second electronic potential is between negative 20,000 volts and negative 50,000 volts DC.

20. The method of claim 18, wherein cooling the pre-collector body component comprises providing a convective cooling channel that is adjacent to the pre-collector body component.

* * * * *